Patented Aug. 10, 1937

2,089,877

UNITED STATES PATENT OFFICE 2,089,877

PROCESS FOR PRODUCING PAINT SOLUTIONS FROM RUBBER

Edward Orland Coats, Warrensburg, Mo.

No Drawing. Application April 20, 1936
Serial No. 75,495

1 Claim. (Cl. 134—17)

This invention relates to processes for producing paint solutions from rubber.

The ordinary method of producing solutions from rubber includes the step of melting rubber in boiling linseed oil and other oils. I have discovered that this step is of no benefit to paints or varnishes for the reason that the rubber is rendered dead or flat from the heat, that is, it is burnt, and also I have discovered that the sulphur and zinc oxides, pigments, and fillers left in the paint solutions are oxidizing elements and are very detrimental to paints.

To overcome the above disadvantages, and with a view to producing a new and better rubber solution for use in modern painting and allied arts, from rubber by-products such as old automobile tires, tubes, and the like, I have provided a process and composition of matter whereby all oxidizing elements, saponifiable constituents, sulphur, zinc oxides and fillers are eliminated, and whereby the life or resiliency of the rubber is very carefully guarded so as to insure a live film in the final product at the finish of the process.

It is well known that a solution for use in paints made from devulcanized rubber is superior to one made from raw rubber or rubber that has never been vulcanized, for the following reasons, providing however the rubber is never damaged in the process.

First, toughness of film, which is essential in paints and varnishes to withstand wear from normal uses and cleaning.

Second, flexibility of film.

Third, resistance to heat and sunlight.

Fourth, the film is live, that is, it possesses tension or is resilient from internal stresses.

Fifth, the film is moisture resisting, and finally economy results from the use of junk rubber.

Also, it will be pointed out that rubber as a base for paints is most valuable because of its resistance to acids, alkalis and moisture, and not as might be supposed, because of its elastic qualities.

The process and article comprising this invention is as follows:

First, the junk rubber is comminuted, the purpose of this being to make available to the acting solution, the largest amount of surface with the shortest distance to penetrate, and this allows faster action by the solution in the second step.

The second step comprises treating the mass with carbon disulphide ($CS_2$) for a time period of about one hour, at a temperature of about 60 degrees Fahrenheit. This loosens the tension, causes expansion of the rubber, and allows the carbon disulphide to dislodge the sulphur and free other constituents of the rubber.

In the third step the mass is treated to a hot water bath at about 100 degrees C. until the rubber sinks and ceases to float on the water, at which time the rubber is free from sulphur and carbon disulphide.

In carrying out the fourth step the mass is placed in a cauldron of 2NaOH solution in which the proportions of the ingredients are substantially as follows:

| | |
|---|---|
| 2NaOH | two pounds |
| $H_2O$ | five gallons |
| Rubber | ten pounds |

Agitation is resorted to in this step, as well as in the second and third steps, and the fourth step is continued at a temperature of 100 degrees C. until scum stops forming on the surface of the solution after skimming, and this step is continued usually for a time period of from two to four hours. At the end of this step the rubber is completely devulcanized and is devoid of carbon disulphide, sulphur, fillers, and oxidizing agents.

The fifth step of the process consists of thoroughly washing and drying the rubber preparatory to the next step. The final step consists in dissolving the rubber in any solvent such as benzol or the like for decanting or filtering for use as a constituent of paint.

During the step in which the rubber is treated with carbon disulphide, the sulphur and other rubber fillers such as zinc oxide and other substances are loosened in the rubber itself. During the step of heating in the caustic soda solution the rubber is freed of all the above enumerated substances which are detrimental to paint.

To produce good live rubber in the product it is necessary that the raw material, that is, junk rubber must be good live rubber and not rotten, burnt or deteriorated to the point where it is dead or flat.

What is claimed is:

A process of forming a rubber paint composition consisting of comminuting vulcanized rubber scrap, treating the mass with carbon disulphide for a period of about one hour at a temperature of about 60 degrees F., treating the mass in a hot water bath until the rubber sinks at which time the rubber is free of S and carbon disulphide, treating the rubber to a bath of which the proportions are sodium hydroxide 2 pounds, water 5 gallons, rubber ten pounds, for a time period of from two to four hours at a temperature of 100 degrees F. until scum stops forming on the surface of the solution after skimming at which time the mass is devoid of fillers and oxidizing agents, washing and drying the rubber, dissolving the rubber in a solvent such as benzol, and filtering the product for use as a constituent of paint.

EDWARD ORLAND COATS.